United States Patent
Hu

[15] 3,663,321
[45] May 16, 1972

[54] ALLOY DIODE CHARACTERISTICS CONTROL METHOD

[72] Inventor: King Lau Hu, Torrance, Calif.
[73] Assignee: TRW, Inc., Lawndale, Calif.

[22] Filed: Nov. 14, 1969
[21] Appl. No.: 876,748

[52] U.S. Cl. .................... 148/181, 148/185
[51] Int. Cl. .................... H01l 7/34
[58] Field of Search .................... 148/181, 177, 179, 180, 182, 148/183, 184, 185, 1.5

[56] References Cited

UNITED STATES PATENTS 3,464,867 9/1969 Queen .................... 148/181

*Primary Examiner*—Richard O. Dean
*Attorney*—Spensley, Horn & Lubitz

[57] ABSTRACT

A method for controlling the electrical characteristics of alloy diodes by subjecting the diode to a series of at least two carefully controlled reheat steps in order to result in predictable electrical characteristics for the diode. The first heat step involves heating the diode, after the PN junction has been formed and the device has been brought to room temperature, to a predetermined temperature of from 800° C. to 1,100° C. for from 15 seconds to 1 hour; thereafter and while the device is still at the predetermined temperature, the temperature is varied one or more times by a predetermined amount ΔT. ΔT is in the range from ¼° C. to 30° C.

16 Claims, 7 Drawing Figures

INVENTOR.
KING LAU HU

By His Attorneys

Spensley & Horn.

INVENTOR
KING LAU HU,
BY HIS ATTORNEYS
Spensley & Horn

ALLOY DIODE CHARACTERISTICS CONTROL METHOD

BACKGROUND OF THE INVENTION

1. Field of the Invention

The present invention relates to a method for controlling and improving the electrical characteristics of alloy junction diodes including zener diodes, and general purpose diodes and the like.

2. Description of the Prior Art

According to the prior art alloy junctions, PN diodes were generally produced in a one step process involving the heating of a silicon semiconductor crystal die, typically of N type conductivity, together with a source of aluminum to a temperature above the eutectic temperature of silicon-aluminum and thereafter cooled to room temperature. Such is described in U.S. Pat. No. 2,757,324 issued July 31, 1956 entitled "Fabrication of Silicon Translating Devices" by G. L. Pearson.

Diodes made in accordance with this prior art process suffer from certain shortcomings, the most noteworthy of which are the following. The yield of zener diodes to a given electrical characteristic such as the sharpness of the knee in the current voltage curve of zener diodes is not as good as may be achieved by the present invention. Further, an order of magnitude of tolerance in resistivity variation for the starting wafers employed in manufactured alloy diodes may be brought about by the present invention. Leakage current may be substantially reduced over prior art alloy diodes.

Another prior art patent which is of interest is U. S. Pat. No. 3,464,867 entitled "Low Voltage Avalanche Process" issued Sept. 2, 1969 to Henry Mack Queen. Therein is described a process for enhancing the breakdown voltage characteristics of an alloyed diode. That invention involved the discovery that by reheating a previously formed and cooled alloy diode to a predetermined temperature in excess of 900° C. and then rapidly cooling the same then the electrical properties are thereby enhanced. While this process does indeed produce marked improvement in such diodes, it has been found that the results are not as repeatable as desired and further, the resistivity of the starting crystal if reproducibility is to be enhanced, must be selected for a given device within a very close tolerance range.

SUMMARY OF THE INVENTION

It is, therefore, an object of this invention to provide a novel method for the control of alloy diode characteristics.

Another object of this invention is to provide a method for substantially increasing the yield of alloy diodes to predetermined electrical characteristics.

It is another object of this invention to provide a method for substantially improving the electrical characteristics of zener diodes.

It is a further object of the present invention to provide a method for substantially increasing the yield of zener diodes to predetermined electrical characteristics.

This invention is for a method of controlling alloy diode characteristics by carrying out the following steps. An alloy diode is manufactured through formation of the alloy junction step in the usual manner. Thereafter, the room temperature wafer including the PN junction is heat soaked or reheated one or more times to a predetermined temperature after which it is rapidly cooled to room temperature. In one type of low voltage zener alloy diode the following steps are carried out thusly:

1. An aluminum wire is alloyed to a N type silicon wafer by heating the same in a furnace to above the eutectic temperature of aluminum-silicon (577° C.) after which the wafer returns to room temperature. Typically, 400 junctions are produced at one time by 400 aluminum wires being alloyed to a one inch diameter wafer.

2. The wafer with the 400 PN junctions is placed into a second open tube furnace through which nitrogen gas is caused to flow in an amount from 2 to 10 cubic feet per hour.

The second furnace is heated to a temperature in the range from about 800° C. to 1,100° C. This heating step is maintained for from ¼ minute to 1 hour.

3. While the wafer is still in the second furnace the temperature therein, after having been initially at a predetermined temperature in the range from 800° C. to 1,100° C., is lowered therefrom by a predetermined amount in the range from ±¼° to ±30° C. and maintained at this lower temperature for from 10 seconds to 3 minutes.

4. The wafer is removed from the second furnace to be quenched in air so as to cause a temperature drop of approximately 100° C. per second.

All of the above are ranges of temperatures and times, which will specifically be set forth in detail hereinafter as to particular diodes in order to result in diodes having predetermined electrical characteristics and with a high yield rate to such characteristics.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 2:
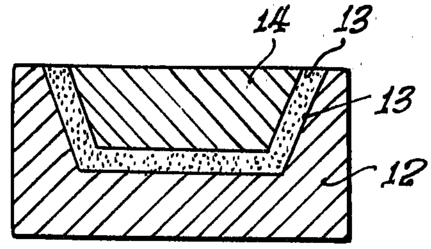
FIG. 2 is an enlarged cross sectional view of a single alloy junction zener diode from the wafer of FIG. 1 taken along line 2—2 of FIG. 1.
Figure 6:
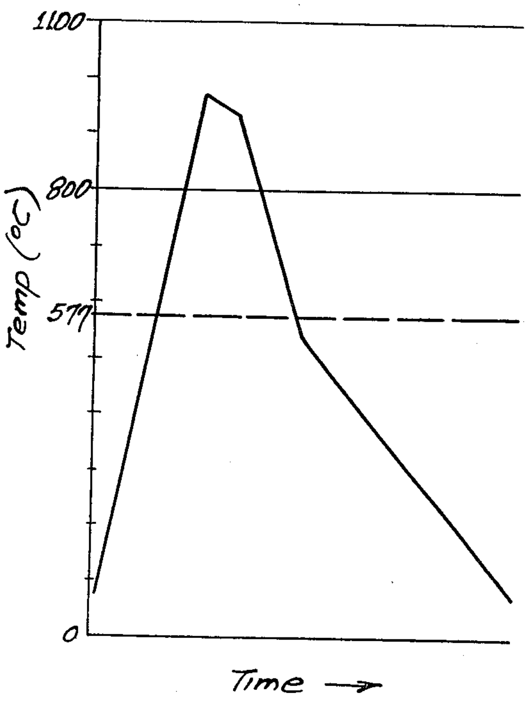
Figure 7:
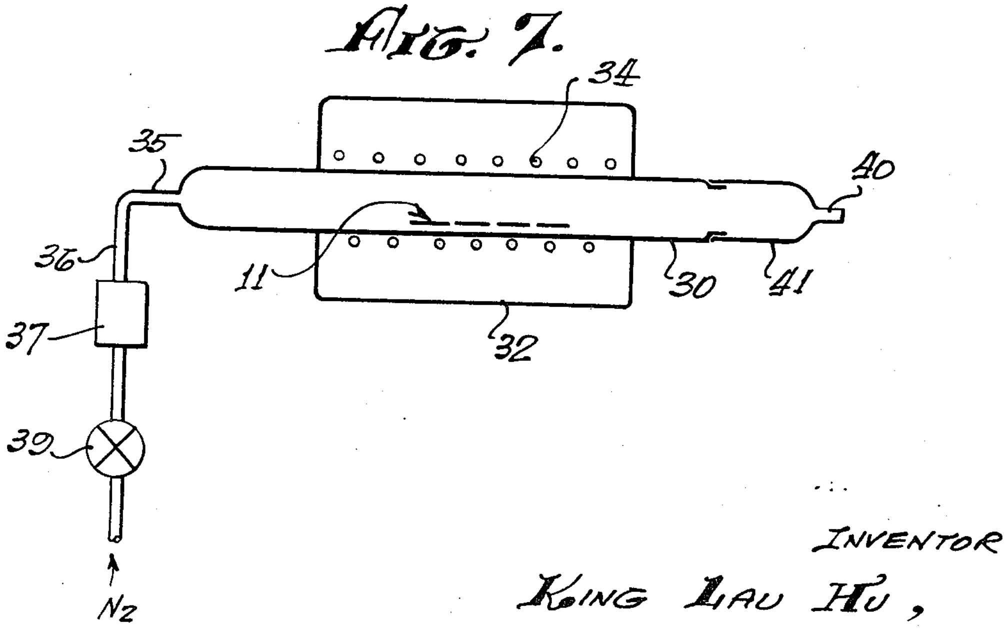

FIG. 6 is a plot of still another time temperature schedule to which an alloy junction diode as shown in FIG. 2 may be exposed in accordance with a preferred embodiment of the present invention method wherein a substantially constantly decrease in temperature characterizes the temperature change; and FIG. 7 is a schematic view of an open tube furnace arrangement which may advantageously be employed in carrying out the presently preferred embodiment of the method of the present invention.

Figure 1:
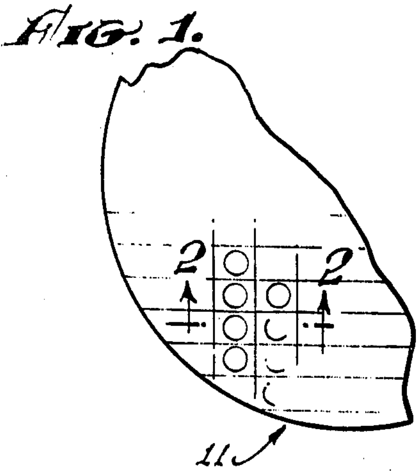
FIG. 1 is an enlarged plan view of a silicon wafer during an intermediate step of production of making a plurality of alloy junction zener diodes.

Referring to the drawings, FIG. 1 shows an enlarged plan view of a portion of a silicon wafer 11 in which there have been formed numerous alloy zener diode junctions by well known prior art methods. A cross sectional view of one such diode cut from wafer 11 is shown in FIG. 2 and includes an N type silicon base or die 12, a region of regrown aluminum doped silicon (P type silicon) 13, and an area containing a mixture of aluminum and aluminum alloyed with silicon 14. At the interface of base 12 and regrown region 13 is the diode junction 15.

In accordance with one prior art method of making such diodes, a plurality of aluminum pellets or spheres are disposed on the surface of a wafer of N type silicon and heated to a temperature of between 577° C. and 900° C., and subsequently slowly cooled to room temperature. The heat causes the aluminum pellets to alloy with the silicon wafer and form junctions as shown in FIG. 2 and described above.

Junction formation is followed, in the prior art, by cleaning, dicing, attaching of leads and packaging, but I have found that subjecting the junctions to a second thermal cycle before these finishing operations results in substantial improvement in critical diode characteristics.

Diodes manufactured by this or other prior art processes are satisfactory for many applications, but suffer from poor dynamic impedance (particularly diodes having breakdown voltages between 4 and 10 volts) and high reverse leakage current. The resistivity of the raw N type silicon wafer must also be held to close tolerances in order to achieve the desired breakdown voltage. Further processing in accordance with the Queen U.S. Pat. No. 3,464,867 will substantially improve the dynamic impedance ($Z_z$) and reverse leakage characteristics ($I_R$) of the diodes, but the yield of improved diodes has been found to be not as high as might be desired.

I have found that by subjecting wafers containing junctions made according to the prior art of a second thermal treatment cycle utilizing a schedule different from that disclosed in U.S. Pat. No. 3,464,867 and such as illustrated in FIGS. 3, 4, 5, and 6, a greater yield of diodes having desirable dynamic impedance and reverse leakage characteristics can be achieved. In addition, the zener breakdown voltage, which is normally a function of the resistivity of the raw N type silicon material, can be varied to compensate for variations in the raw material. It is possible, with a proper thermal treatment schedule to produce diodes with a tolerance of ±2 percent for zener breakdown voltage from silicon wafers having a ±20 percent variation in resistivity.

Figure 3:
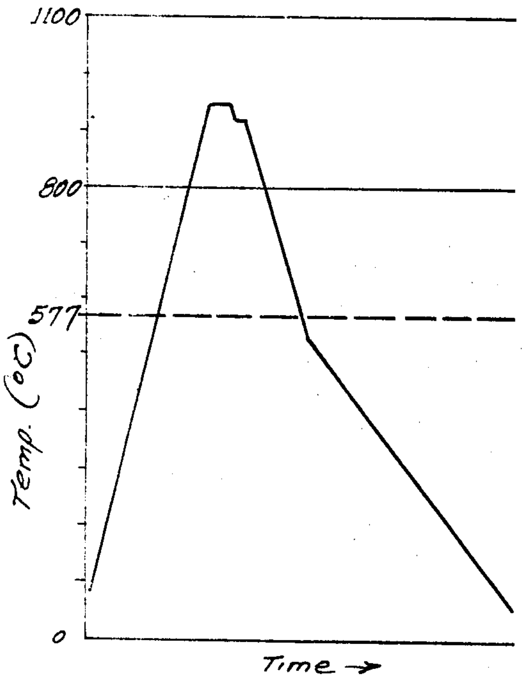
FIG. 3 is a plot of the time temperature schedule to which an alloy junction diode as shown in FIG. 2 may be exposed in accordance with a preferred embodiment of the present inventive method wherein a negative temperature change is shown.

After the initial alloy junction formation by a prior art process, the wafer containing junctions so formed is subjected to a second time temperature cycle as diagrammed, for example, in FIG. 3. The wafer, initially at room temperature, is placed in an oven containing a nitrogen atmosphere and rapidly heated to a temperature above 800° C., but below 1,100° C. The temperature used is dependent on the resistivity of the silicon wafer, a resistivity higher than nominal for a given desired breakdown voltage requiring a lower temperature and conversely a resistivity lower than nominal requiring a higher temperature. After holding at temperature for a predetermined time, 15 seconds to 1 hour, the temperature is reduced by ¼° to 30° C. and then either quenched immediately or held at the second temperature for up to 3 minutes and then quenched. The quenching step consists of rapidly (in a period of 1 to 2 seconds) removing the wafer from the oven and placing it on a transite block to air cool. The cooling preferably proceeds at a rate exceeding 100° C./second until the eutectic temperature of the alloy (aluminum/silicon) is reached. Thereafter cooling is preferably at a substantially lower rate such that room temperature is reached in about 10 minutes. Further processing of the diodes is done by conventional methods.

Figure 4:
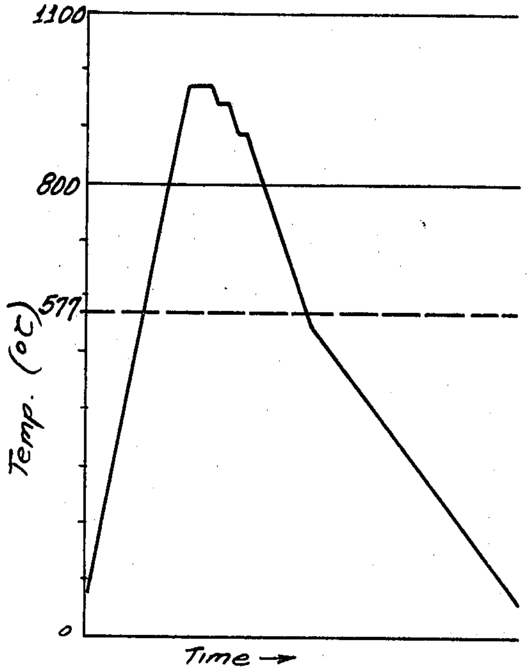
FIG. 4 is a plot of still another time temperature schedule to which an alloy junction diode as shown in FIG. 2 may be exposed in accordance with a preferred embodiment of the present invention method wherein two temperature changes are shown.

Still another possible thermal treatment schedule is diagrammed in FIG. 4. In this figure two changes in temperature are shown. Although both changes illustrated are negative, it will be understood that the changes can be either both positive or one positive and one negative. Each change is in the range of ¼° to 30° C. and holding times of 15 seconds to 1 hour for the first temperature and from 0 (i.e. as little as 10 seconds) to 3 minutes for the second and third temperatures.

Figure 5:
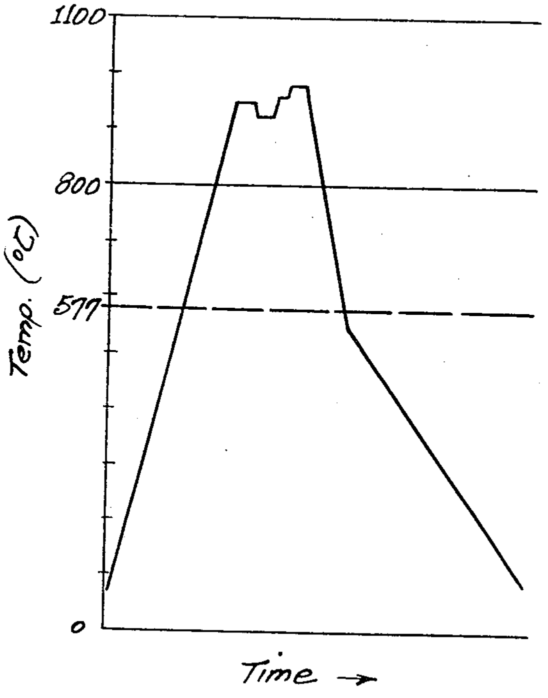
FIG. 5 is a plot of a fourth time temperature schedule to which an alloy junction diode as shown in FIG. 2 may be exposed in accordance with a preferred embodiment of the present invention method wherein three temperature changes are shown.

FIG. 5 illustrates a fourth thermal treatment schedule including three temperature changes. Again, the changes may be either positive or negative, all in the same direction or not. The initial temperature can be held from 15 seconds to 1 hour as before and subsequent temperatures from 0 (i.e. as little as 10 seconds) to 3 minutes. As before the temperature steps are from ¼° to 30° C.

The three critical characteristics, zener voltage, dynamic impedance and leakage current are all affected in a complicated way by both the magnitude and duration of the temperatures changes and, therefore, in order to achieve the desired combination of characteristics a thermal treatment schedule involving several different temperatures held for different lengths of time might be required. Normally the desired characteristics are a target zener voltage, minimum dynamic impedance and minimum leakage current. As a general rule, if the first change in temperature is positive the primary effect is an increase in leakage current and a decrease in dynamic impedance. A second order effect is a decrease in zener voltage. A second temperature change affects leakage current primarily, but also affects dynamic impedance and zener voltage somewhat. A positive change degrades leakage current, but improves dynamic resistance and reduces the zener voltage.

It can be seen that an optimum thermal treatment schedule can be determined for a particular wafer or group of wafers depending on the relationship that the characteristics of the junctions of the wafer after being formed by the prior art process bears to the desired characteristics. Several examples follow:

EXAMPLE 1

Starting with an 0.023 ohm centimeter N type silicon wafer placed in an oven at 730° C. with aluminum pellets in the standard manner to produce alloy junctions and subsequently cooled to room temperature, the resulting diode will have the following characteristics:

$V_z$ = 5.2 v. at 1 ma.
$Z_z$ = 300 Ω at 1 ma. DC + 0.1 ma. AC
$I_R$ = 1 μa. at 2 v.

The wafer in a quartz boat is then placed in an oven set at 940° C. and through which nitrogen is flowing at the rate of 4 cubic feet per hour (cfh). This temperature is maintained for 20 minutes after which time the temperature is reduced by 2° C. This temperature is maintained for 30 seconds then the temperature is dropped an additional 1° to 937° C. and held for 15 seconds. The wafer, in the quartz boat, is then quickly removed from the furnace (in 1 to 2 seconds) and placed on a transite block where it is allowed to cool at a rate exceeding 100° C./second to 577° C. and thereafter to 25° C. at a slower rate, reaching 25° C. in approximately 10 more minutes.

The final characteristics of the device are:

$V_z$ = 6.2 v. at 1 ma.
$Z_z$ = 40 Ω at 1 ma. DC + 0.1 ma. AC
$I_R$ = 0.5 μa. at 5.6 v.

EXAMPLE 2

The starting material is N type silicon with a resistivity of 0.007 ohm centimeter. Alloy junctions are made in the usual way resulting in the following characteristics $V_z$ = 3.2 v. at 20 ma.
$Z_z$ = 1,200 Ω at 0.25 ma. DC + 0.025 ma. AC
$I_R$ = 10 μa. at 0.75 v.

The wafer is heated to 850° C. for 4 minutes with a nitrogen flow of 3 cfh then the furnace is reset to 820° C. for 4 minutes more. The wafer is then removed from the furnace and air quenched as described above in EXAMPLE 1. The resulting characteristics are:

$V_z$ = 3.2 v. at 20 ma.
$Z_z$ = 1,000 Ω at 0.25 ma. DC + 0.025 ma. AC
$I_R$ = 10 μa. at 1 v.

EXAMPLE 4

The starting material for this example is 0.05 ohm centimeter resistivity N type silicon and junctions made in accordance with the prior art have the following characteristics:

$V_z$ = 10 v. at 1 ma.
$Z_z$ = 30 Ω at 1 ma. DC + 0.1 ma. AC
$I_R$ = 2 μa. at 9 v.

The wafer is heated to 820° C. for approximately 10 minutes with nitrogen flowing at approximately 3 cfh. The furnace is then shut off with the nitrogen still flowing. The cooling rate in the furnace as a result of shutting off the heat supply is approximately 6° C. per minute. The wafer is left in the furnace for 2 minutes or until the temperature drops to 808° C. This treatment schedule is illustrated in FIG. 6. The wafer is then quickly removed from the furnace and air quenched as described above. The final characteristics are:

$V_z$ = 10 v. at 1 ma.

$Z_z$ = 30 Ω at 1 ma. DC + 0.1ma. AC $I_R$ = 1 μa. at 9 v.

With most temperature controllers, it is very difficult to make temperature changes of the order of 10° C. or less, however, such changes can be made by changing the flow rate of nitrogen through the furnace. Thus, in carrying out that mentioned procedure where a temperature drop of as little as ¼° C. is called for is accomplished by removing the cap from the nitrogen exit tube to the furnace thereby increasing the nitrogen flow rate. It will be understood that while the invention has been described calling for the presence of nitrogen during processing, the presence of any particular atmosphere is not essential to practice of this invention and the process could be practiced in a vacuum if desired.

In FIG. 7 there is shown a schematic diagram of an open tube furnace arrangement for carrying out the presently preferred embodiment of the inventive method. A quartz tube 30 is disposed within and forms a part of furnace 32. Surrounding the quartz tube 30 are heating coils 34. Disposed within the tube 30 are a plurality of wafers 11. At the entrance end 35 of the tube 30 nitrogen gas is received from line 31 through flow meter 37, the rate of flow of the gas is controlled by valve 39, the gas being supplied from a source not shown. The nitrogen gas exits through an opening 40 in quartz cap 41. As was previously indicated, when a very small ΔT is required the cap 41 may merely be removed from the exit end of tube 30 as this small a temperature change cannot be affected merely by valve 39.

There has thus been described a new and improved method of improving electrical characteristics of alloyed diodes.

I claim:

1. A method for improving the electrical characteristics of a PN alloy junction diode by subjecting said diode to a minimum of two heating steps including the steps of:

a. heating said PN alloy diode to a first predetermined temperature;

b. maintaining said first temperature for a first predetermined period of time;

c. changing the temperature of said diode to a second predetermined temperature;

d. maintaining said second temperature for a second predetermined period of time; and e. cooling said diode to a temperature below the eutectic temperature of the alloy of said diode, all of said predetermined temperatures being above the eutectic temperature of the alloy of said diode.

2. A method for improving the electrical characteristics of a PN alloy junction diode as recited in claim 1, wherein:

a. said first predetermined temperature is in the range of 800° C. to 1,100° C.; and b. the difference between said first and second temperatures is in the range from about ±¼° to about ±30° C.

3. A method for improving the electrical characteristics of a PN alloy junction diode as recited in claim 2, wherein:

a. said first predetermined time is in the range from about 15 seconds to 1 hour; and b. said second predetermined time is less than about 3 minutes.

4. A method for improving the electrical characteristics of a PN alloy junction diode as recited in claim 3, wherein said cooling of said diode is done at a rate exceeding 100° C. per second until the temperature of said diode is less than the eutectic temperature of the alloy of said diode.

5. A method for improving the electrical characteristics of a PN alloy junction diode as recited in claim 1, wherein said cooling of said diode is done at a rate exceeding 100° C. per second until the temperature of said diode is less than the eutectic temperature of the alloy of said diode.

6. A method for improving the electrical characteristics of a PN alloy junction diode as recited in claim 1 and further including the steps of:

a. changing the temperature of said diode to a third predetermined temperature after said second period of time; and b. maintaining said third predetermined temperature for a third predetermined period of time before said cooling of said diode.

7. A method for improving the electrical characteristics of a PN alloy junction diode as recited in claim 6, wherein:

a. said first predetermined temperature is in the range of about 800° to 1,100° C.; and b. the difference between said first temperature and said second temperature and between said second temperature and said third temperature is in the range of about ±¼° to ±30° C.

8. A method for improving the electrical characteristics of a PN alloy junction diode as recited in claim 7, wherein:

a. said first predetermined time is in the range from about 15 seconds to 1 hour; and b. said second and third predetermined times are less than about 3 minutes.

9. A method for improving the electrical characteristics of a PN alloy junction diode as recited in claim 8, wherein said cooling of said diode is done at a rate exceeding 100° C. per second until the temperature of said diode is less than the eutectic temperature of the alloy of said diode.

10. A method for improving the electrical characteristics of a PN alloy junction diode as recited in claim 6 and further including the steps of:

a. changing the temperature of said diode to a fourth predetermined temperature after said third period of time; and b. maintaining said fourth predetermined temperature for a fourth predetermined period of time before said cooling of said diode.

11. A method for improving the electrical characteristics of a PN alloy junction diode as recited in claim 10, wherein said predetermined temperatures are all in the range of about 800° to 1,100° C. and said temperature changes are all in the range of from about ±¼° to ±30° C.

12. A method for improving the electrical characteristics of a PN alloy junction diode as recited in claim 11, wherein said first period of time is in the range of about 15 seconds to 1 hour and all other of said periods of time are less than about 3 minutes.

13. A method for improving the electrical characteristics of a PN alloy junction diode as recited in claim 11, wherein said cooling of said diode is done at a rate exceeding 100° C. per second until the temperature of said diode is less than the eutectic temperature of the alloy of said diode.

14. A method for improving the electrical characteristics of a PN alloy junction diode by subjecting said diode to a minimum of two heating steps including the steps of:

a. heating said PN alloy diode to a first temperature between about 800° C. and 1,100° C.;

b. subjecting said diode to a plurality of predetermined temperatures, said temperatures being different from said first temperature; and c. cooling said diode to a temperature below the eutectic temperature of the alloy of said diode, said predetermined temperatures all being above the eutectic temperature of the alloy of said diode.

15. A method for improving the electrical characteristics of a PN alloy junction diode as recited in claim 1, wherein said heating is done in a gaseous atmosphere and said temperature change is made by altering the flow rate of said gas over said diode.

16. A method for improving the electrical characteristics of a PN alloy junction diode by subjecting said diode to a minimum of two heating steps including the steps of:

a. heating said PN alloy diode to a first temperature between about 800° C. and 1,100° C.;

b. by changing the temperature of said diode at a predetermined rate for a predetermined period of time from said first temperature to a temperature above the eutectic temperature of the alloy of said diode; and c. cooling said diode to a temperature below the eutectic temperature of the alloy of said diode.

* * * * *